(12) United States Patent
Kuure et al.

(10) Patent No.: US 8,094,664 B2
(45) Date of Patent: Jan. 10, 2012

(54) SESSION BASED COMMUNICATION

(75) Inventors: Pekka Kuure, White Plains, NV (US); Tapio Paavonen, Pirkkala (FI)

(73) Assignee: Nokia Corporation, Espoo (FI)

( * ) Notice: Subject to any disclaimer, the term of this patent is extended or adjusted under 35 U.S.C. 154(b) by 1031 days.

(21) Appl. No.: 11/980,041

(22) Filed: Oct. 30, 2007

(65) Prior Publication Data

US 2008/0212523 A1    Sep. 4, 2008

(30) Foreign Application Priority Data

Nov. 3, 2006  (FI) ..................................... 20060972

(51) Int. Cl.
H04L 12/56 (2006.01)

(52) U.S. Cl. ..................................... 370/395.2; 709/227

(58) Field of Classification Search .................. None
See application file for complete search history.

(56) References Cited

U.S. PATENT DOCUMENTS

| | | | |
|---|---|---|---|
| 6,070,192 A | 5/2000 | Holt et al. | |
| 6,166,730 A | 12/2000 | Goode et al. | |
| 7,283,489 B2 * | 10/2007 | Palaez et al. | 370/277 |
| 7,684,356 B2 * | 3/2010 | Wu | 370/260 |
| 2003/0147401 A1 * | 8/2003 | Kyronaho et al. | 370/395.41 |
| 2005/0198623 A1 * | 9/2005 | Amin et al. | 717/144 |
| 2005/0237952 A1 | 10/2005 | Punj et al. | |
| 2005/0265318 A1 | 12/2005 | Khartabil et al. | |
| 2006/0067287 A1 | 3/2006 | Kim et al. | |
| 2006/0083244 A1 * | 4/2006 | Jagadesan et al. | 370/395.2 |
| 2006/0155814 A1 * | 7/2006 | Bennett et al. | 709/207 |
| 2007/0177603 A1 * | 8/2007 | Calme et al. | 370/395.2 |
| 2007/0268930 A1 * | 11/2007 | Bond et al. | 370/467 |
| 2008/0081604 A1 * | 4/2008 | Sung et al. | 455/422.1 |
| 2008/0101412 A1 * | 5/2008 | Schwagmann et al. | 370/474 |
| 2008/0320083 A1 * | 12/2008 | Albertsson et al. | 709/205 |

FOREIGN PATENT DOCUMENTS

| | | |
|---|---|---|
| EP | 1 770 941 | 4/2007 |
| JP | 2005-318535 | 11/2005 |
| WO | WO 2006/073488 | 7/2006 |

OTHER PUBLICATIONS

Office Action dated Sep. 21, 2010 from Australian patent application No. 2007316108, 2 pages.
Campbell et al., 'The Message Session Relay Protocol', draft-ietf-simple-message-sessions-02.txt.IETF Standard-Working-Draft, Internet Engineering Task Force, IETF, CH.Oct. 23, 2003, p. 23 lines 29-35, p. 24 lines 16-19.
Sawada et al., 'SIP (Session Initiation Protocol) Usage of Offer/Answer Model'; draft-ietf-sipping-sip-offeranswer-03.txt. IETF Standard-Working-Draft, Internet Engineering Task Force, IETF, CH. Aug. 28, 2007, pp. 1-23.
Office Action with translation dated Nov. 10, 2010 from Korean Application No. 10-2009-7011417, 7 pages.
Biswas et al., "A QoS-Aware Routing Framework for PIM-SM Based IP-Multicast", IEEE, 2000, 6 pages.
The Office action, with English translation, of Japanese application No. 2009-535095 dated Aug. 8, 2011, 5 pages.
The Office action, with English translation, of Chinese Application No. 200780040956.2 dated Aug. 24, 2011, 14 pages.

* cited by examiner

*Primary Examiner* — Min Jung
(74) *Attorney, Agent, or Firm* — Hollingsworth & Funk, LLC

(57) ABSTRACT

A user terminal requesting a session establishment although the session already exists, is informed on the existing session in a response to the request. If the user terminal offered in the request one or more media types that were rejected, the response contains an indication of a reason for rejection.

25 Claims, 4 Drawing Sheets

SESSION BASED COMMUNICATION

FIELD OF THE INVENTION

The invention relates to session-based communication in a communications system, and especially to communication in which multiple media types may be offered.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolvement of communication technology, particularly IP-based communication technology and end user terminals, has enabled versatile communication possibilities and introduction of different services. More and more often services are implemented using primitives provided by SIP (session initiation protocol) which is not vertically integrated into a communications system but a tool to build a multimedia architecture. More precisely, SIP is an IETF defined application-layer control (signalling) protocol for creating, modifying, and terminating sessions with one or more participants.

One special feature which may utilize SIP sessions is group communication. The term "group", as used herein, refers to any logical group of two or more users, i.e. group members, intended to participate in the same group communication, and group communication covers a session between two or more participants. Examples of group communication include conferencing, Internet telephone calls, multimedia distribution, multimedia conferencing, instant messaging, and chatting.

Due to the versatile communication possibilities, different media types can be usable in a group, such as voice, instant messages, video, gaming service, music, file transfer, etc. Typically only some of the above media types are used in a session. A user wanting to establish a session with other group members may send a SIP request having an SDP (session description protocol) offer defining media types the user wants to offer for the session. However, a policy or a rule may have been defined which may cause that one or more of the offered media types will be rejected by a server controlling the session establishment or a group member, for example, since the session already exists. One of the problems associated with the above arrangement is that the user will not receive any information why the session establishment request was accepted only partly, i.e. not as a whole, the reason being, for example, that the session already exists.

SUMMARY

An object of the present invention is thus to provide a method and an apparatus for implementing the method so as to overcome the above problem. The object is achieved by methods, apparatuses, modules, signalling messages, a system and a program product, which are characterized by what is stated in the independent claims. The preferred embodiments are disclosed in the dependent claims.

BRIEF DESCRIPTION OF THE DRAWINGS

In the following, embodiments will be described in greater detail with reference to the accompanying drawings, in which.

DETAILED DESCRIPTION OF SOME EMBODIMENTS

Figure 1:
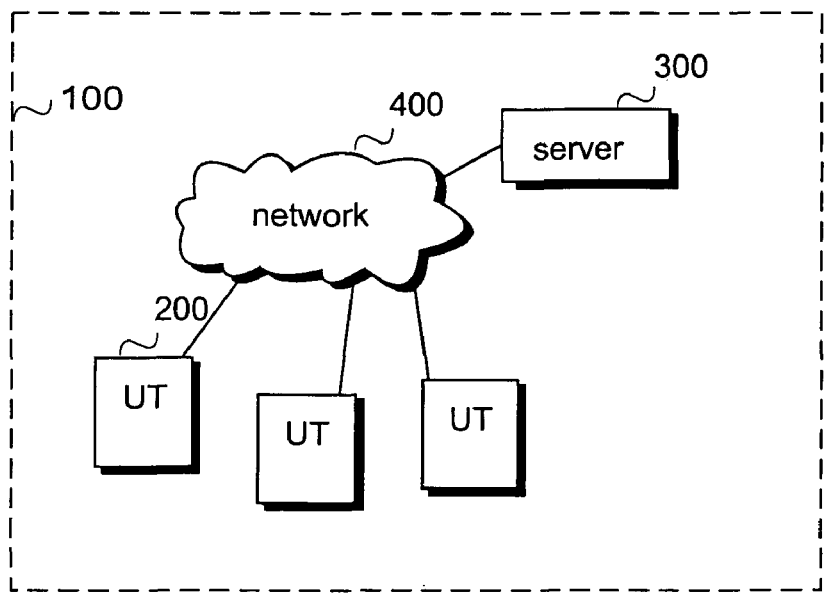
FIG. 1 illustrates an example of a general architecture of a communication system providing a group communication service.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any user terminal, server, corresponding component, and/or to any communication system or any combination of different communication systems that support SIP-based sessions and provides possibility to offer multiple media types to sessions. No limitations exist to the session type, or to the media types, or to the offering mechanism. The communication system may be a fixed communication system or a wireless communication system or a communication system utilizing both fixed networks and wireless networks. The protocols used, the specifications of communication systems, servers and user terminals, or corresponding components, especially in wireless communication, develop rapidly. Such development may require extra changes to an embodiment. Therefore, all terms and expressions should be interpreted broadly and they are intended to illustrate, not to restrict, the embodiment.

In the following, different embodiments will be described using, as an example of a system architecture whereto the embodiments may be applied, an architecture based on SIP for signalling and session establishment, and SDP for conveying information on offered media types without restricting the embodiment to such an architecture, however. SIP and SDP are defined by Internet Engineering Task Force (IETF). SIP is a control (signalling) protocol for creating, modifying, and terminating sessions with one or more participants. SDP is a text-format application layer protocol for conveying media details, transport addresses, and other session description metadata, such as media types, irrespective of how that information is transported. In other words, SIP and SDP are not vertically integrated into a communication system. IETF specifications and Internet Drafts can be found at http://www.ietf.org.

A media type covers here a general type of data and/or communication means which are negotiable between endpoints, such as user terminals. Examples of media types include, but are not limited to, text (textual information), image (image data), audio (audio data), video (video data), application (some other kind of data, typically either uninterpreted binary data or information to be processed by an application), multipart (data consisting of multiple entities of independent data types) and message (an encapsulated message). In addition, media types contain different sub-types and/or connection types (including different overlay services) providing group communication services. Thus, media types may be selected from the group of 'poc', 'im', 'audio', 'video', 'conference', 'application', 'all', 'other', for example.

A general architecture of a communication system providing SIP-based sessions is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and protocols used in or for group communication, are irrelevant to the actual invention. Therefore, they need not be discussed in more detail here.

The communication system 100 illustrated in FIG. 1 comprises user terminals (UT) 200, which are connectable to a server 300 via one or more networks 400 including access and core networks, whenever required.

A user terminal 200 is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminal include a personal computer, a game console, a laptop (a notebook), a personal digital assistant, a mobile station (mobile phone), and a line telephone.

A server 300 is a piece of equipment or a device hosting a session. A server hosting a session takes care of a session, i.e. controls a session, or acts as a focus or controlling function for a session. In other words, all session related control traffic will pass the server, and the server may use different policies, for example server-specific policies or group-specific or user-specific policies, to control the session and the session establishment.

One implementation environment to which an embodiment may be applied is a group communication architecture utilizing XDM (XML Document Management). Open Mobile Alliance (OMA) has defined XDM as a generic framework for group and list management based on XCAP protocol (XML Configuration Access Protocol). OMA specifications can be found at http://www.openmobilealliance.org. XDM defines a common mechanism that makes user-specific service-related information, such as group definitions, accessible to different applications (service enablers) and clients residing in user equipment, and enables creation, modification, retrieval and deletion of such information. The application providing the group communication service may be PoC (push to talk over cellular), messaging, or conferencing, for example. PoC specification is currently being developed by a PoC working group under the OMA. More detailed information on the PoC can be found via the above-mentioned Internet pages of OMA. Thus, the server 300 may be a PoC server, an instant messaging server, or a conference server that supports different media types, such as audio, video and messaging. However, the server 300 may be a user terminal comprising the required functionality and being configured to act as a server according to an embodiment.

Figure 2:
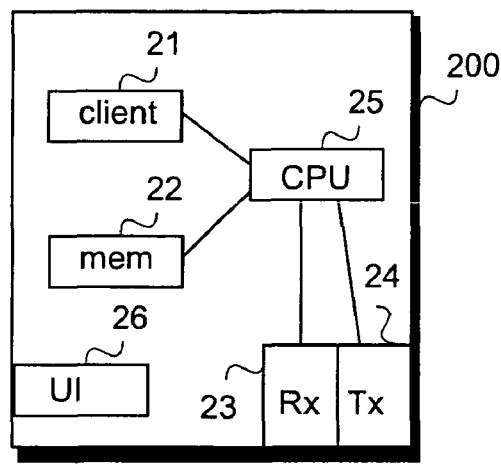
FIGS. 2 and 3 are simplified block diagrams of apparatuses.

FIG. 2 illustrates a simplified block diagram of an apparatus 200 configured as a user terminal according to an embodiment, the apparatus being called below a user terminal. The user terminal 200 comprises one or more application client units (client) 21, at least one of the application client units being configured to be an application client unit according to an embodiment, called below a client, a data storage, such as a memory (mem) 22, a receiver (Rx) 23 for receiving and a transmitter (Tx) 24 for sending communications (messages, information, signalling, different outputs or inputs), a user interface (UI) 26 for receiving user instructions, and for providing information to a user, and one or more operation processors 25 for processing one or more clients, for processing and controlling receiving and sending communications including session establishments, for processing and controlling receiving user instructions and providing information to a user via the user interface 26 and for controlling use of the memory. It is apparent to a person skilled in the art that the user terminal may comprise other components, entities, functions and structures that need not be described in detail herein, or comprise only some of the above described components. It is also possible that a user terminal participating in a session does not comprise any client according to an embodiment, i.e. the user terminal is not configured to perform all functionalities described below with a user terminal according to an embodiment, and only some of the functionalities may be implemented.

The client or the user terminal in which the client resides may be configured to provide client functionality for determining a reason of a media type rejection according to an embodiment. The client or the user terminal in which the client resides may further be configured to use the reason when deciding whether or not it is possible to get the media type accepted later. For this purpose, the client or the user terminal in which the client resides may be configured to store the reason, or its indication, at least temporarily, to the data storage 22.

The functionality of the client 21 is described in more detail below with FIGS. 4 and 7.

Figure 3:
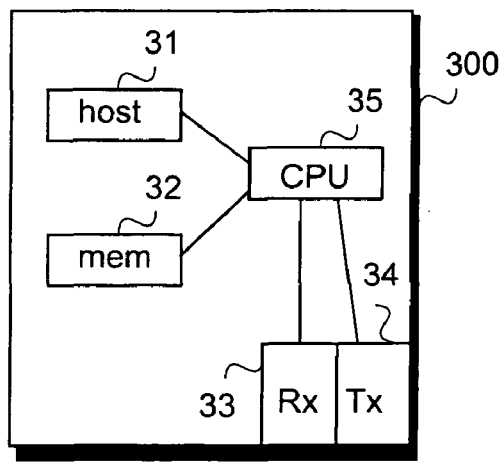

FIG. 3 illustrates a simplified block diagram of an apparatus 300 configured as a server component according to an embodiment, the apparatus being called below a server. The server 300 comprises one or more application host units (host) 31 for hosting sessions, at least one of the application host units being configured to be an application host unit according to an embodiment, called below a host, a data storage, such as a memory (mem) 32, a receiver (Rx) 33 for receiving and a transmitter (Tx) 34 for sending communications (messages, information, signalling, different outputs or inputs), and one or more operation processors 35 for processing one or more hosts, for processing and controlling receiving and sending communications relating to a session, including session establishments, for processing and controlling sessions and for controlling use of the memory. It is apparent to a person skilled in the art that the server may comprise other components, entities, functions and structures that need not be described in detail herein, or comprise only some of the above described components. It is also possible that a server hosting a session does not comprise any host according to an embodiment, i.e. the server is not configured to perform all functionalities described below with a server according to an embodiment, and only some of the functionalities may be implemented.

The host may be configured to provide host functionality for providing a user terminal offering a media type a reason of a media type rejection according to an embodiment. The host may further be configured to decide whether or not to reject the offered media type. For this purpose, the host may be configured to store the reason, or its indication, at least temporarily, to the data storage 32.

The functionality of the host 31 is described in more detail below with FIGS. 5, 6 and 7.

Apparatuses, such as servers, or corresponding server components, user terminals and/or other corresponding devices or apparatuses implementing the functionality of a corresponding apparatus described with an embodiment comprise not only prior art means, but also means for implementing functionality of a corresponding apparatus described with an embodiment and they may comprise separate means for each separate function, or means may be configured to perform two or more functions. Present apparatuses comprise processors and memory that can be utilized in an embodiment. For example, the application client unit 21, or the host unit 31, may be a software application, or a module, or a unit configured as an arithmetic operation, or as a program, executed by an operation processor. All modifications and configurations required for implementing functionality of an embodiment may be performed as routines, which may be implemented as added or updated software routines, application circuits (ASIC) and/or programmable circuits. Software routines, also called program products, including applets and macros, can be stored in any apparatus-readable data storage medium and they include program instructions to perform particular tasks. Software routines may be downloaded into an apparatus. The apparatus, such as a server, or a corresponding server component, or a user terminal, or a corresponding user terminal may be configured as a computer or a microprocessor, such as single-chip computer element, including at least a memory for providing storage area used for an arithmetic operation and an operation processor for executing the arithmetic operation. An example of the operation processor includes a central processing unit. The memory may be removable memory detachably connected to the apparatus. An example of an apparatus-readable medium is a computer readable medium having computer-executable instructions, which when executed, perform a process comprising: receiving a request relating to a session, the request offering one or more media types for the session, adding to a response to the request, in response to an offered media type being rejected, an indication of a reason for rejection; and sending the response.

In the following, different embodiments are described assuming, for the sake of clarity, that a request to establish a session is not rejected as a whole, although one or more media types may be rejected, and that if a media type is rejected, a reason is indicated and that there are two reasons for rejection: a policy-based or a session exists already. Further, the session may be for one-to-one communication, one-to-one communication within a group or one-to-many communication, or many-to-many, or many-to-one communication. In this context, a user, or more precisely a user terminal, which has joined a session is called a participant. In other words, the number of participants when the request is sent may be zero, one, two, three, etc.

Figure 4:
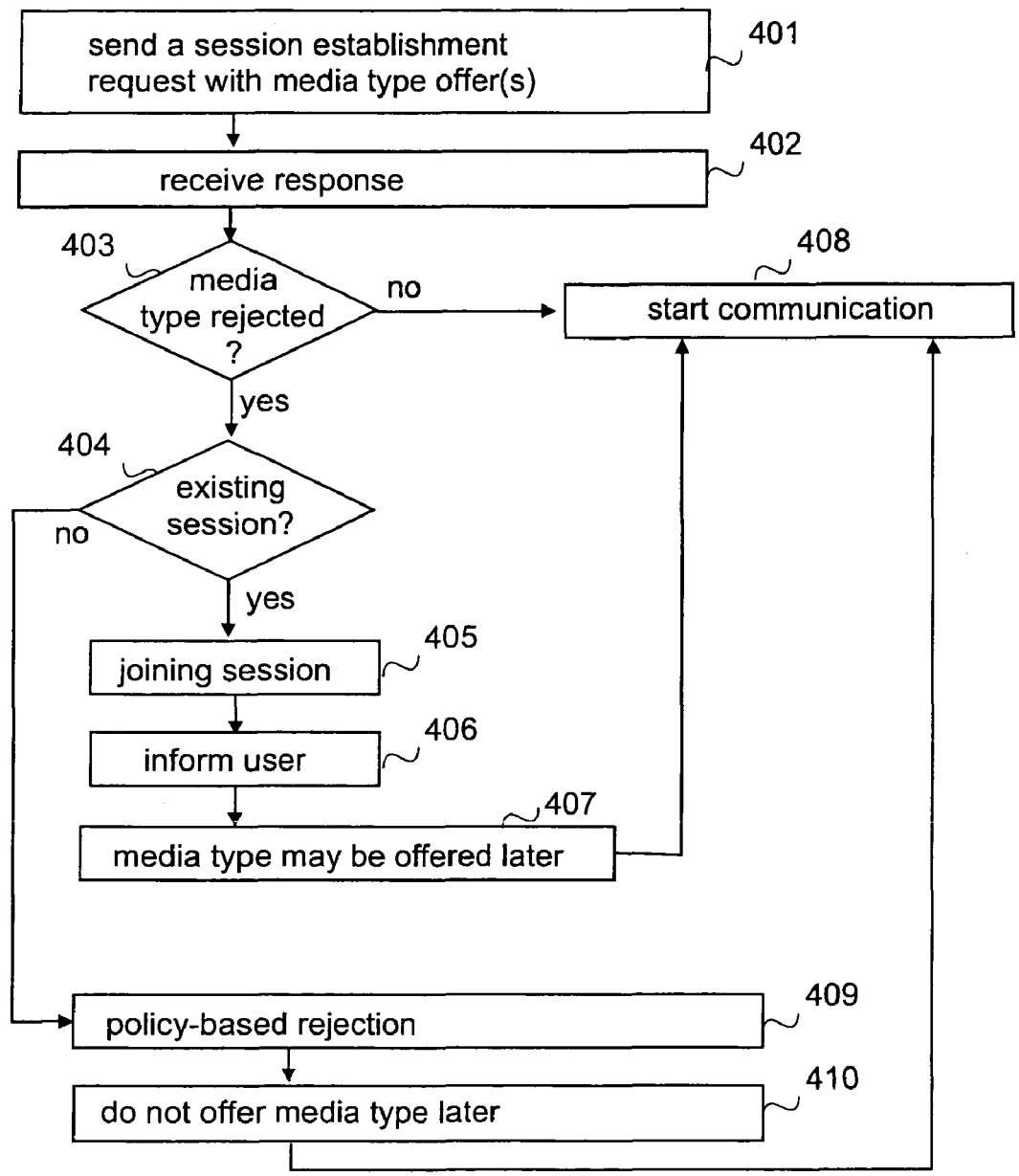
FIGS. 4, 5 and 6 are flow charts each illustrating functionality of an apparatus.

FIG. 4 illustrates an embodiment of a client in a user terminal. However, for the sake of clarity, the term "user terminal" is used in the following.

FIG. 4 starts when a user terminal sends, in step 401, a session establishment request with one or more media type offers. The request may be a SIP INVITE with SDP offering the media types, and the request may be sent to a URI of a server, or a corresponding service in a server taking care of the session establishment. The URI is a uniform resource identifier for identifying an abstract or physical resource.

When the user terminal receives a response (step 402) indicating acceptance of at least part of the request, the user terminal checks, in step 403, whether or not an offered media type has been rejected. If an offered media type has been rejected the user terminal checks, in step 404, whether or not the indication of the reason indicates an existing session. If it indicates, the user terminal deduces, in step 405, that instead of establishing a session the user terminal is joining an existing session, and informs, in step 406, the user that the session already exists and the media type that was rejected. In addition to that, the user terminal deduces, in step 407, that the rejected media type was not one of the negotiated media types and may be offered later during the session, and then starts communication in step 408.

If the reason does not indicate an existing session (step 404), the reason for rejection is policy-based (step 409). In other words, the reason may depend on host policy, user's subscriber information, or group definitions, for example. Therefore, the user terminal deduces, in step 410 that the media type is not to be offered later because the policy remains the same. Then the user terminal starts communication in step 408.

The response received may be a SIP 200 OK with an SDP body indicating accepted and rejected media types and with a warning header comprising a three-digit text code and an explanatory text, for example according to a format <xxx>.+ <explanatory text>, the format being defined at least in OMA PoC specifications. The explanatory text to indicate that a session already exists may be "session exists", or "joining a session" or "rejected by a participant". However, it should be appreciated that any other appropriate header, field or bit may be used to indicate the reason for rejection, or to indicate an event taking place and providing information on the basis of which a potential reason for rejection may be deduced, and that there are no limitations to the content of the explanatory text.

In another embodiment, the user terminal may be configured to interpret that a rejected media type with a warning header, or corresponding indication, means that the session already exists, regardless of the content of the warning header. In other words, the user terminal of this embodiment is configured to recognize only one reason, the reason being an existing session.

In another embodiment, the user terminal may be configured to interpret that a rejected media type with a warning header, or corresponding indication, means that the reason to reject the media type is that the session already exists, regardless of the content of the warning header, and that a rejected media type without a warning header, or corresponding indication, means that the media type was rejected because of policy.

If more than one media type is rejected because the session already exists, the user terminal may be configured to inform all rejected media types once, not one by one, to the user.

In an embodiment, if the response contains more than one rejected media type but only one indication of the reason for rejection, the user terminal is configured to interpret that the reason is the same for all rejected media types.

In an embodiment, if the response contains more than one rejected media type but only one indication of the reason for rejection, the user terminal is configured to interpret that the reason is for the media type with which the indication is, and that other media types are rejected because of the other reason.

In an embodiment, the user terminal is configured to interpret a response indicating acceptance of a session establishment request and containing at least one accepted media type and at least one rejected media type with an indication of the reason for rejection, such as a warning header, to indicate that the session already exists and instead of establishing a session, the user terminal is joining to an established session.

In an embodiment, the user terminal may be configured, in addition to indicating to the user that one or more of the offered media types are rejected, to indicate to the user those rejected media types that might be acceptable later, i.e. that may be offered later, and to ask the user to select whether or not to offer the media types later.

In an embodiment, the user terminal may be configured to offer later without any user instructions, the rejected media types that are deduced to be "a media type that may be offered later".

In an embodiment, in which a rejected media type may or may not be associated with an indication of the reason for rejection, the user terminal is configured to deduce that not to offer the media type later if the indication is missing.

In an embodiment, the user terminal is configured, in response to receiving the response (step 402), to immediately trigger communication using the accepted media types.

Figure 5:
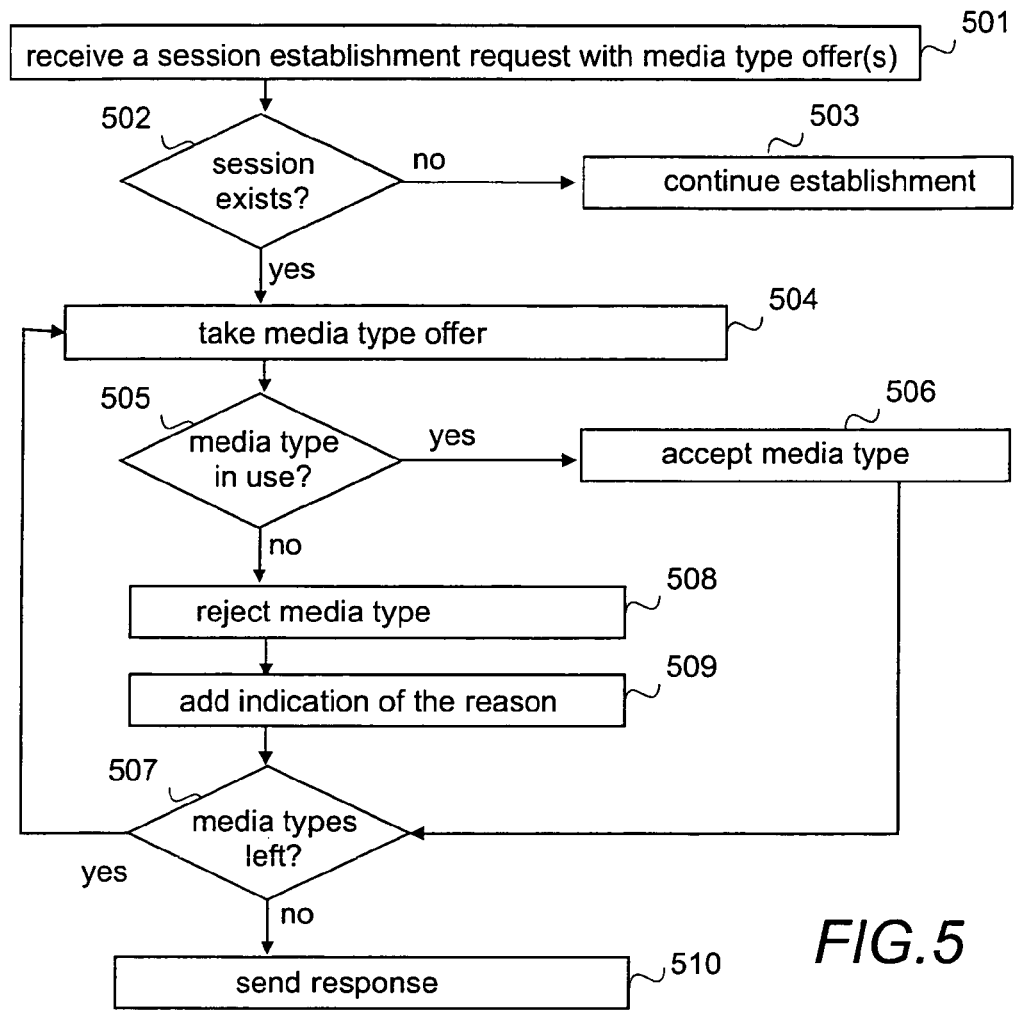
Figure 6:
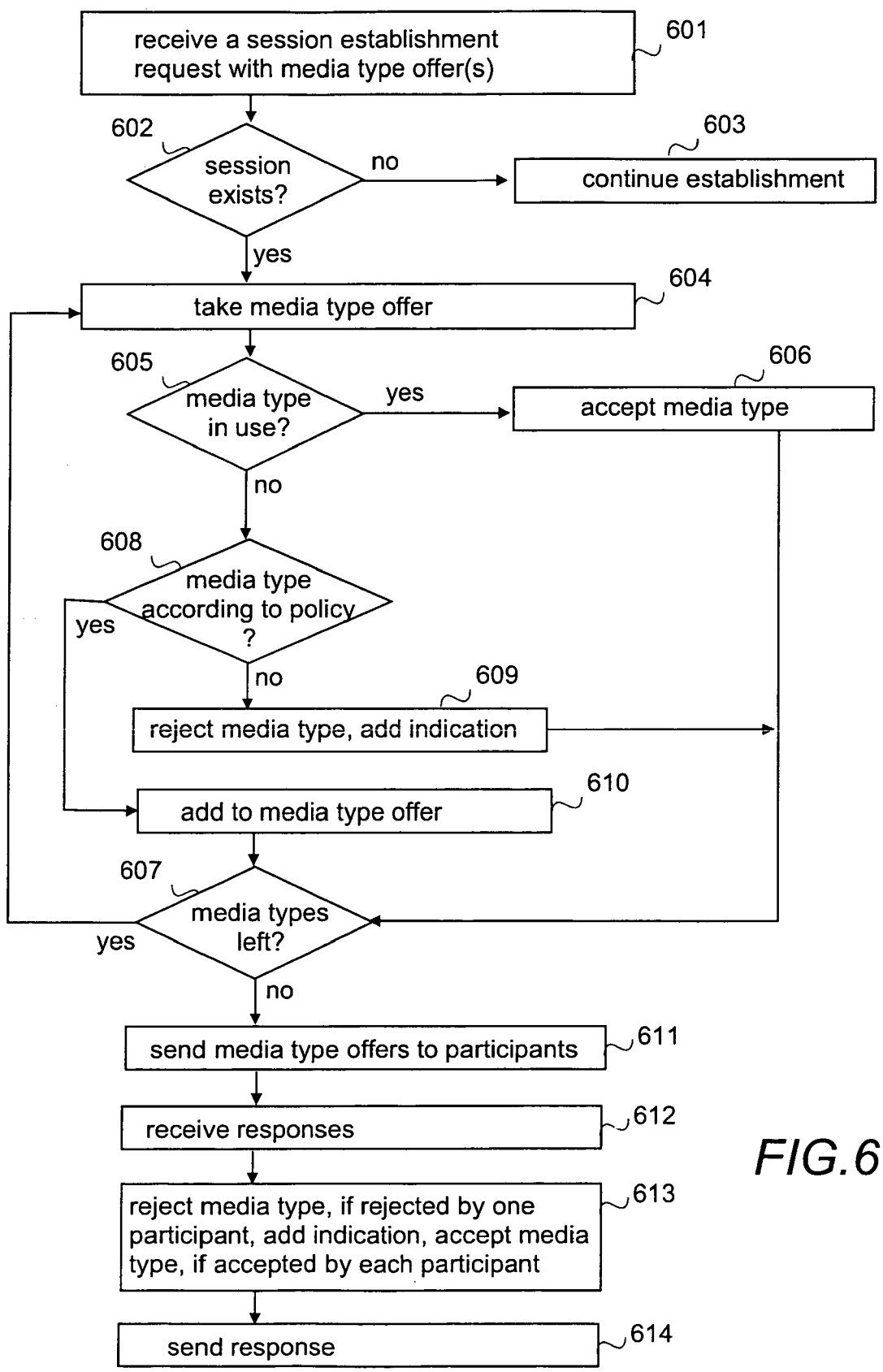

FIGS. 5 and 6 illustrate embodiments of a host. Since a host typically locates in a server, the term server is used in the following for the sake of clarity.

Referring to an embodiment illustrated in FIG. 5, the server receives, in step 501, a session establishment request with one or more media type offers. In response to the request, the server checks, in step 502, whether or not the session already exists. If the session does not exist, the server continues, in step 503, the session establishment. How the session is actually established and/or how communication within the session continues bears no significance to the invention and therefore it is not described in detail herein.

If the session already exists, the server takes, in step 504, a media type offer, and checks, in step 505, whether or not the media type is in use, i.e. a negotiated media type for the session. If it is, the server accepts, in step 506, the media type, and then checks, in step 507, whether or not all offered media types are checked. If not, the server continues from step 504 by taking a media type offer.

If the media type is not in use (step 505), the server rejects, in step 508, the media type, and takes care, in step 509, that an indication of a reason for rejection is added to a response. Then the server continues from step 507 by checking, whether or not all offered media types are checked.

If all offered media types are checked (step 507), the server sends, in step 510, a response to the request, the response indicating each offered media type either as accepted or rejected, and associating each rejected media type with an indication of a reason for rejection.

An advantage of the embodiment in FIG. 5 is that the other participants of the session are not disturbed by the session establishment request received in step 501.

In the embodiment of FIG. 6, the server preferably maintains information on participants of a session, or is otherwise configured to receive required information. However, since the embodiment does not necessitate any changes to retrieval of information on participants, it is not described in detail here.

Referring to the embodiment illustrated in FIG. 6, steps 601 to 607 correspond to step 501 to 507, respectively, illustrated in FIG. 5, and are therefore not repeated here in vain.

If the media type is not in use (step 605), the server checks, in step 608, whether or not the media type fulfills policy requirements, i.e. if the media type is according to a policy defined for the user terminal, for the session, for a group, for the server, or for something else. The present invention does not limit policy definitions, and any policy may be used. The policy requirements may be defined by a rule, or a set of rules, for example. If the media type fails to fulfill policy requirement(s), the server rejects, in step 609, the media type and continues from step 607 by checking, whether or not all offered media types are checked. If the media type fulfills the policy requirement(s), the server adds, in step 610, the media type to an offer and continues from step 607 by checking, whether or not all offered media types are checked.

If all offered media types are checked (step 607), the server sends, in step 611, media type offers to participants, the offer containing media type(s) added in step 610. The server receives, in step 612, responses from the participants, each response indicating which of the media type(s) offered are accepted, which rejected. The server is configured to form, in step 613, a response to the request received in step 601, the response indicating each offered media type either as accepted or rejected, and associating each rejected media type with an indication of a reason for rejection. The response contains the media types rejected or accepted by the server (i.e. steps 606 and 609). As regards the media types offered to participants, the server is configured to accept a media type if all participants accepted it and to reject a media type if at least one participant rejected it. Depending on the implementation, the indication of the reason for rejection may be the same regardless of whether it was rejected by the server or a participant, or the indication may depend on the entity rejecting the media type. Further, some additional information on the rejection may be added.

Then the server sends, in step 614, the response.

An advantage of the embodiment in FIG. 6 is that the media types the sender of the request of step 601 wanted to offer for participants of the session but which are not in use, are offered to the other participants, thus satisfying the original intention.

An advantage of the above-described implementations, in which if a media type is rejected, the reason is indicated, is that the user terminal can deduce whether or not it is reasonable, for example, to re-offer the media that was rejected in a later phase of the session. For example, if a rule, or any other policy exists, which defines that only media types already in use in an existing session are accepted while other media types are automatically rejected, and the indicated reason is "Session already ongoing", the user terminal may be configured to deduce from the association (media type rejected, reason indicated), that an offer offering the rejected media type later to the session will be rejected, and thus there is no sense to offer it, but the rejected media type can be offered again later after the session has been terminated and a new session is established. A further advantage of the implementation is that with it a trial and error type approach, for example, may be avoided, said approach leading to a decreased end user satisfaction.

Although not described in detail above, if there is additional information available, such that a certain media type is not allowed or authorized for the user offering the media type, the response to the user terminal may contain also other reasons indicating the additional information, such as the user is not authorized to add the media type to the session. In this case, the user terminal may be configured to deduce that it is not reasonable to offer the rejected media again, because it is not authorized to do so. In other words, there may be one or more reasons included in the response about the rejection of the media type.

Figure 7:
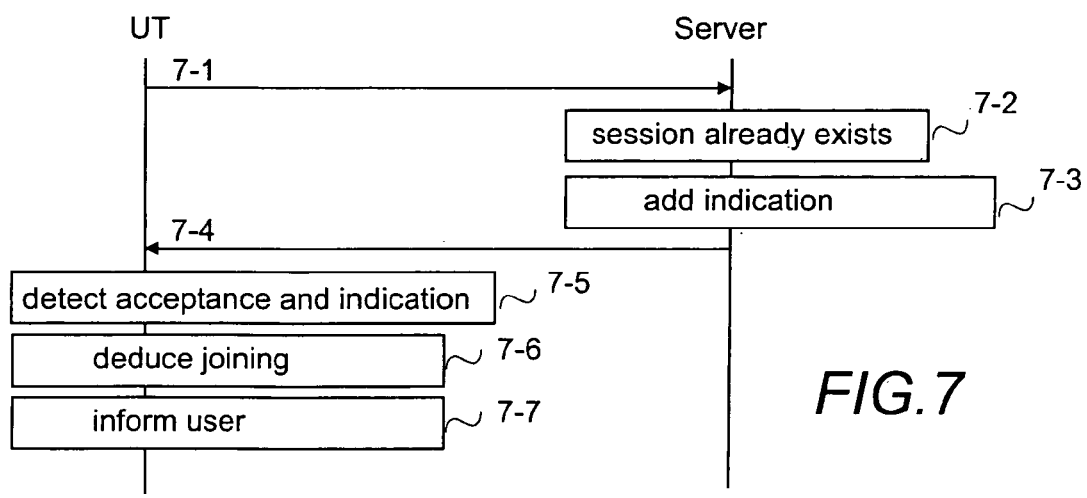
FIG. 7 illustrates a signalling according to an embodiment.

FIG. 7 is a signalling chart illustrating how the indication of a reason for rejection may be utilized according to an embodiment although a request for establishing a session contains no media offers. In the example of FIG. 7 it is assumed that a session already exists and a user terminal wanting to establish the session is allowed to join the session.

Referring to FIG. 7, the user terminal UT wants to establish a session and sends a request for session establishment 7-1. In the illustrated example the request contains no media offers, and it may be a SIP INVITE send to an URI of a server hosting the session or providing session communication for the user terminal. In response to the request, the server detects, in point 7-2, that the session already exists, and therefore adds, in point 7-3, to a response indicating acceptance of the request, an indication of a reason for rejection, and sends the response 7-4. The response may be a SIP 200 OK and the indication may be any of the above-described indications of a reason for rejection.

The user terminal detects, in point 7-5, that it received an acceptance with an indication of a reason for rejection, and deduces, in point 7-6, that the acceptance is a partial acceptance indicating that the session establishment has been converted to joining the session, i.e. the session already exists, and informs, in point 7-7, the user that the user is joining an existing session.

An advantage that a user, who assumes that he/she is establishing a session but actually is joining an existing session, receives information on the session already existing, is that the user knows where to stand with the communication, i.e. is mentally prepared to be a part of an ongoing communication. Prior art solutions lack the mechanism to offer such information to a user.

The steps/points, signalling messages and related functions described above in FIGS. 4 to 7 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. For example, steps 608 and 609 may be left out. The server operations and user terminal operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
sending a request relating to a session, the request offering one or more media types for the session; and
receiving a response to the request, the response indicating at least one rejected media type and an indication of a reason for the rejection of the at least one rejected media type.

2. The method of claim 1, wherein the request is a session establishment request.

3. The method of claim 1, further comprising:
using the reason to deduce whether to try to offer the media type for the session later.

4. The method of claim 1, wherein the response indicates an acceptance of the request.

5. The method of claim 1, wherein the indication is a warning header comprising a three-digit text code and an explanatory text.

6. The method of claim 1, wherein the reason includes one of the following group comprising: an existing session, a participant rejection, and a policy-based rejection.

7. A method comprising:
receiving a request relating to a session, the request offering one or more media types for the session,
adding to a response to the request, in response to an offered media type being rejected, an indication of a reason for the rejection of the rejected media type; and
sending the response.

8. The method of claim 7, wherein the reason includes one of the following group comprising: an existing session, a participant rejection, and policy-based rejection.

9. The method of claim 7, further comprising
noticing that the request is a session establishment request for an existing session;
comparing the offered one or more media types with one or more media types negotiated for the session; and
if an offered media type is not a negotiated media type, rejecting the offered media type and indicating that the reason is an existing session.

10. The method of claim 7, further comprising
noticing that the request is a session establishment request for an existing session;
sending an offer identifying the one or more media types to other participants of the session;
receiving acknowledgements from the other participants; and
if an offered media type is not accepted by a participant, rejecting the offered media type and indicating the reason for rejection.

11. The method of claim 7, further comprising
comparing the offered one or more media types with one or more media types negotiated for the session; and
sending, in response to the comparison, an offer identifying the offered media types that are not negotiated media types to other participants of the session.

12. The method of claim 7, wherein the response indicates an acceptance of the request.

13. The method of claim 7, wherein the indication is a warning header comprising a three-digit text code and an explanatory text.

14. An apparatus comprising:
a receiving unit configured to receive responses,
an application client unit configured to form a request relating to a session, the request offering one or more media types for the session, and to be operationally coupled to the receiving unit to receive a response to the request, the response indicating at least one rejected media type and an indication of a reason for the rejection of the at least one rejected media type; and
a sending unit configured to be operationally coupled to the application client unit to send the request.

15. The apparatus of claim 14, wherein the application client unit is further configured to determine on the basis of the indication the reason and to use the reason to deduce whether to try to offer the media type for the session later.

16. The apparatus of claim 14, wherein the application client unit is one of a group comprising a central processing unit, an operation processor, a software application executable by an operation processor, and means for forming the request and receiving the response.

17. The apparatus of claim 14, wherein the apparatus is a user terminal.

18. An apparatus comprising:
a receiving unit configured to receive requests,
an application host unit configured to be operationally coupled to the receiving unit to receive a request relating to a session, the request offering one or more media types for the session, to form a response to the request, to add, in response to an offered media type being rejected, an indication of a reason for the rejection of the rejected media type; and a sending unit configured to be operationally coupled to the application host unit to send the response.

19. The apparatus of claim 18, wherein the application host unit is further configured to notice that the request is a session establishment request for an existing session; to compare the offered one or more media types with one or more media types negotiated for the session; and in response to an offered media type not being a negotiated media type, to reject the offered media type and to indicate that the reason is an existing session.

20. The apparatus of claim 18, wherein the application host unit is further configured to notice that the request is a session establishment request for an existing session; to send an offer identifying the one or more media types to other participants of the session via the sending unit; and in response to a participant not accepting an offered media type, to reject the offered media type and to indicate the reason for rejection; and the receiving unit is further configured to receive acknowledgements from the other participants, the acknowledgments indicating whether an offered media type is accepted by a participant.

21. The apparatus of claim 18, wherein the application host unit is further configured to compare the offered one or more media types with one or more media types negotiated for the session; and in response to the comparison, to send an offer identifying the offered media types that are not negotiated media types to other participants of the session.

22. The apparatus of claim 18, wherein the application host unit is one of a group comprising a central processing unit, an operation processor, a software application executable by an operation processor, and means for forming the request and receiving the response.

23. The apparatus of claim 18, wherein the apparatus is a server component.

24. A non-transitory computer readable medium having computer-executable instructions, which when executed, perform a process comprising:

sending a request relating to a session, the request offering one or more media types for the session; and receiving a response to the request, the response indicating at least one rejected media type and an indication of a reason for the rejection of the at least one rejected media type.

25. The non-transitory computer readable medium of claim 24, further comprising:

deducing based on the reason whether to try to offer the media type for the session later.

\* \* \* \* \*